(No Model.)

H. F. RISCH.
WATER FILTER.

No. 594,160. Patented Nov. 23, 1897.

Witnesses
Philip Sugar
G. S. Hays.

Inventor
Henry F. Risch
By his Attorney
Salomon Sugar

UNITED STATES PATENT OFFICE.

HENRY F. RISCH, OF BROOKLYN, NEW YORK.

WATER-FILTER.

SPECIFICATION forming part of Letters Patent No. 594,160, dated November 23, 1897.

Application filed January 4, 1897. Serial No. 617,993. (No model.)

*To all whom it may concern:*

Be it known that I, HENRY F. RISCH, a citizen of the United States, residing at Brooklyn, in the county of Kings and State of New York, have invented a new and useful Water-Filter, of which the following is a specification.

My invention relates to an improved water-filter; and the object of the invention is to provide a cheap, thorough, rapid, and convenient filter. I attain this object by the device illustrated in the accompanying drawings, in which—

Figures 1, 2:
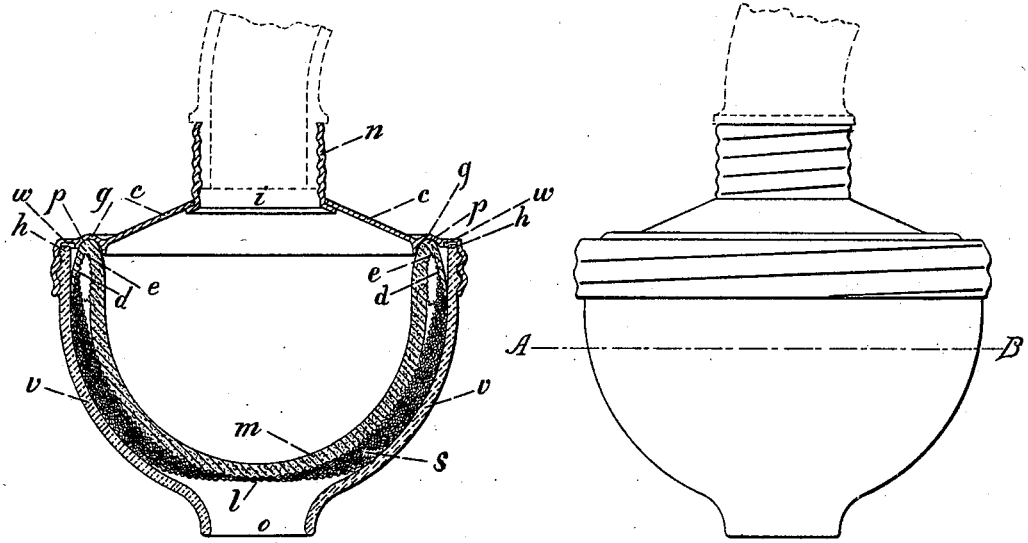
Figure 4:
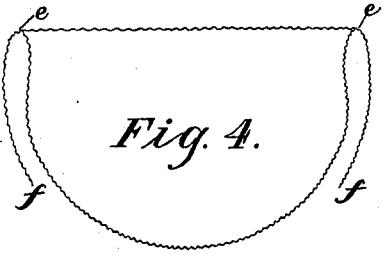
Figure 3:
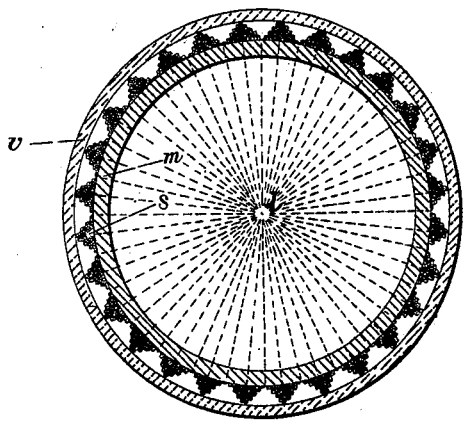

Figure 1 is a vertical section through the center of filter. Fig. 2 is an exterior side view. Fig. 3 is a sectional plan through A B, and Fig. 4 is another sectional view of screen s.

Similar letters refer to similar parts throughout the drawings.

Dotted lines in Figs. 1 and 2 indicate mouth of faucet, to which the filter is attached, and forms no part of my invention.

Dotted lines in Fig. 3 denote corrugations in corrugated screen, hereinafter described.

The metal cap C and semispherical glass or metal vessel $v$ form the outer casing of the filter. Extending upward from the metal cap C is a neck $n$, by means of which connection is made with faucet. The lower part of the semispherically-shaped vessel $v$ turns out and downward and forms the spout or outlet $o$. The semispherical vessel $v$ holds in position a corrugated wire or perforated metal screen $s$, which in turn holds embedded upon its inside surface a layer of fibrous filtering material $m$.

The corrugated screen $s$ may be made of wire or perforated metal or other material, and fits inside of and is held in position by the semispherical vessel $v$. The screen $s$ may also be shaped as shown in Fig. 4, the ends being turned over at $e$ and coming down to point $f$. The corrugations of the corrugated screen $s$ begin at point $l$ in center of screen $s$ and radiate outward and upward until they reach point $d$, where they cease. Above point $d$ the screen $s$ is plain and runs up to $e$, where it laps over, making a rounded edge $e$.

The fibrous filtering material $m$ rests directly and is bedded upon the corrugated screen $s$ and is lapped over the edge $e$ of the corrugated screen, making a rounded edge $p$.

The entire lower portion of filter, consisting of semispherically-shaped vessel $v$, corrugated screen $s$, and fibrous filtering material $m$, is detachable from the metal cap C by means of a detachable connection.

In the drawings I have shown a screw connection between the metal cap C and semispherical vessel $v$; but I do not wish to be understood as limiting myself to this form of connection, as any other suitable detachable coupling will answer.

In the connection between the cap C and semispherical vessel $v$ in a groove on the under side of cap C is a rubber washer $w$, against which the edge $h$ of semispherical vessel $v$ is pressed, thus making a water-tight joint.

The upper edge $p$ of the fibrous filtering material $m$, which is turned down over edge $e$ of the screen $s$, fits in and is pressed into a circular groove $g$ on metal cap C.

Water enters the filter from the faucet, to which it is attached through the inlet $i$, and passing through the fibrous filtering material $m$ and corrugated screen $s$ runs out of filter at the outlet $o$. The semispherical shape of the filtering material $m$ affords a large surface through which the water can filter, thus procuring quick action. The corrugations in the corrugated screen $s$ afford channels through which the water can pass on its way to the outlet $o$ after it has passed through the fibrous filtering material and corrugated screen.

What I claim as my invention, and desire to secure by Letters Patent, is—

1. The combination, in a water-filter, of a semispherically-shaped outer vessel attached to a cap or cover which has connection with a faucet, said outer vessel holding in position on its inner surface a semispherically-shaped corrugated or grooved wire or perforated metal screen, which in turn holds in place a semispherically-shaped bag of filtering material, substantially as described and for the purpose specified.

2. The combination in a water-filter of a semispherically-shaped outer vessel $v$ connected to a cap C and inclosing semispherically-shaped perforated screen $s$ and semispherically-shaped filtering-bag $m$, the upper edge $p$ of filtering-bag $m$ fitting tightly in a groove $g$ on cap C substantially as described.

HENRY F. RISCH.

Witnesses:
PHILIP SUGAR,
G. S. HAYS.